United States Patent
Litke et al.

(10) Patent No.: US 10,031,668 B2
(45) Date of Patent: Jul. 24, 2018

(54) DETERMINING STATUS OF A HOST OPERATION WITHOUT ACCESSING THE HOST IN A SHARED STORAGE ENVIRONMENT

(71) Applicant: Red Hat, Inc., Raleigh, NC (US)

(72) Inventors: Adam Litke, Bethel Park, PA (US); Nir Soffer, Ra'anana (IL); Liron Aravot, Ra'anana (IL)

(73) Assignee: Red Hat Israel, Ltd., Raanana (IL)

( * ) Notice: Subject to any disclaimer, the term of this patent is extended or adjusted under 35 U.S.C. 154(b) by 185 days.

(21) Appl. No.: 15/055,933

(22) Filed: Feb. 29, 2016

(65) Prior Publication Data
US 2017/0249082 A1    Aug. 31, 2017

(51) Int. Cl.
*G06F 9/46* (2006.01)
*G06F 3/06* (2006.01)
*G06F 9/455* (2018.01)

(52) U.S. Cl.
CPC ............ *G06F 3/0604* (2013.01); *G06F 3/065* (2013.01); *G06F 3/067* (2013.01); *G06F 3/0637* (2013.01); *G06F 3/0644* (2013.01); *G06F 3/0664* (2013.01); *G06F 9/45558* (2013.01); *G06F 2009/45583* (2013.01)

(58) Field of Classification Search
CPC combination set(s) only.
See application file for complete search history.

(56) References Cited

U.S. PATENT DOCUMENTS

| | | | |
|---|---|---|---|
| 8,046,552 B2 | 10/2011 | Larson | |
| 8,448,167 B2 | 5/2013 | Kobayashi et al. | |
| 8,583,887 B1 * | 11/2013 | Patel | G06F 13/00 711/161 |
| 8,677,090 B2 | 3/2014 | Araki | |
| 8,725,973 B2 | 5/2014 | Prahlad et al. | |
| 2004/0064633 A1 * | 4/2004 | Oota | G06F 3/0613 711/100 |
| 2005/0149683 A1 * | 7/2005 | Chong, Jr. | G06F 11/1466 711/162 |

(Continued)

FOREIGN PATENT DOCUMENTS

EP    0482853 A2    4/1992

OTHER PUBLICATIONS

"Troubleshooting—SnapProtect for VMware", 2016 NetApp, 22 pages http://docs.snapprotect.com/netapp/v10/article?p=products/vs_vmware/snap/troubleshooting.htm.

(Continued)

*Primary Examiner* — Diem Cao
(74) *Attorney, Agent, or Firm* — Lowenstein Sandler LLP

(57) ABSTRACT

Implementations of the disclosure provides for determining status of a host operation without accessing the host in a shared storage environment. A method of the disclosure includes acquiring, by a processing device, a lease on a storage volume associated with a storage domain. The lease grants the processing device exclusive access to the storage volume. Responsive to acquiring the lease, a data structure associated with the storage volume is modified to indicate that data of the storage volume is invalid. An update operation is initiated with respect to the storage volume. Upon completion of the update operation, the data structure is updated to indicate that the data valid and the lease on the storage volume is released.

20 Claims, 5 Drawing Sheets

(56) References Cited

U.S. PATENT DOCUMENTS

| | | | | |
|---|---|---|---|---|
| 2010/0268904 | A1* | 10/2010 | Sheffield | G06F 3/0613 |
| | | | | 711/163 |
| 2010/0299309 | A1 | 11/2010 | Maki et al. | |
| 2012/0260051 | A1 | 10/2012 | Maki et al. | |
| 2015/0134615 | A1* | 5/2015 | Goodman | G06F 3/0617 |
| | | | | 707/639 |
| 2016/0217177 | A1* | 7/2016 | Niikura | G06F 17/30377 |

OTHER PUBLICATIONS

"Volume Shadow Copy Service", Sep. 3, 2014, 11 pages https://technet.microsoft.com/en-in/library/ee923636(v=ws.10).aspx.
Litke, Adam, "SDM: add the copy VolumeData command", gerrit.ovirt Code Review, Feb. 27, 2015, 2 pages https://gerrit.ovirt.org.
Litke, Adam, "Sweep Away the Garbage for Scalable, Fault-Tolerant Shared VM Storage", FOSDEM 2016—Jan. 30, 2016, 82 pages.

\* cited by examiner

DETERMINING STATUS OF A HOST OPERATION WITHOUT ACCESSING THE HOST IN A SHARED STORAGE ENVIRONMENT

TECHNICAL FIELD

The implementations of the disclosure relate generally to computing infrastructures and, more specifically, relate to determining status of a host operation without accessing the host in a shared storage environment.

BACKGROUND

The virtualization of a data center results in a physical system being virtualized using virtual machines to consolidate the data center infrastructure and increase operational efficiencies. A virtual machine (VM) may be a software-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
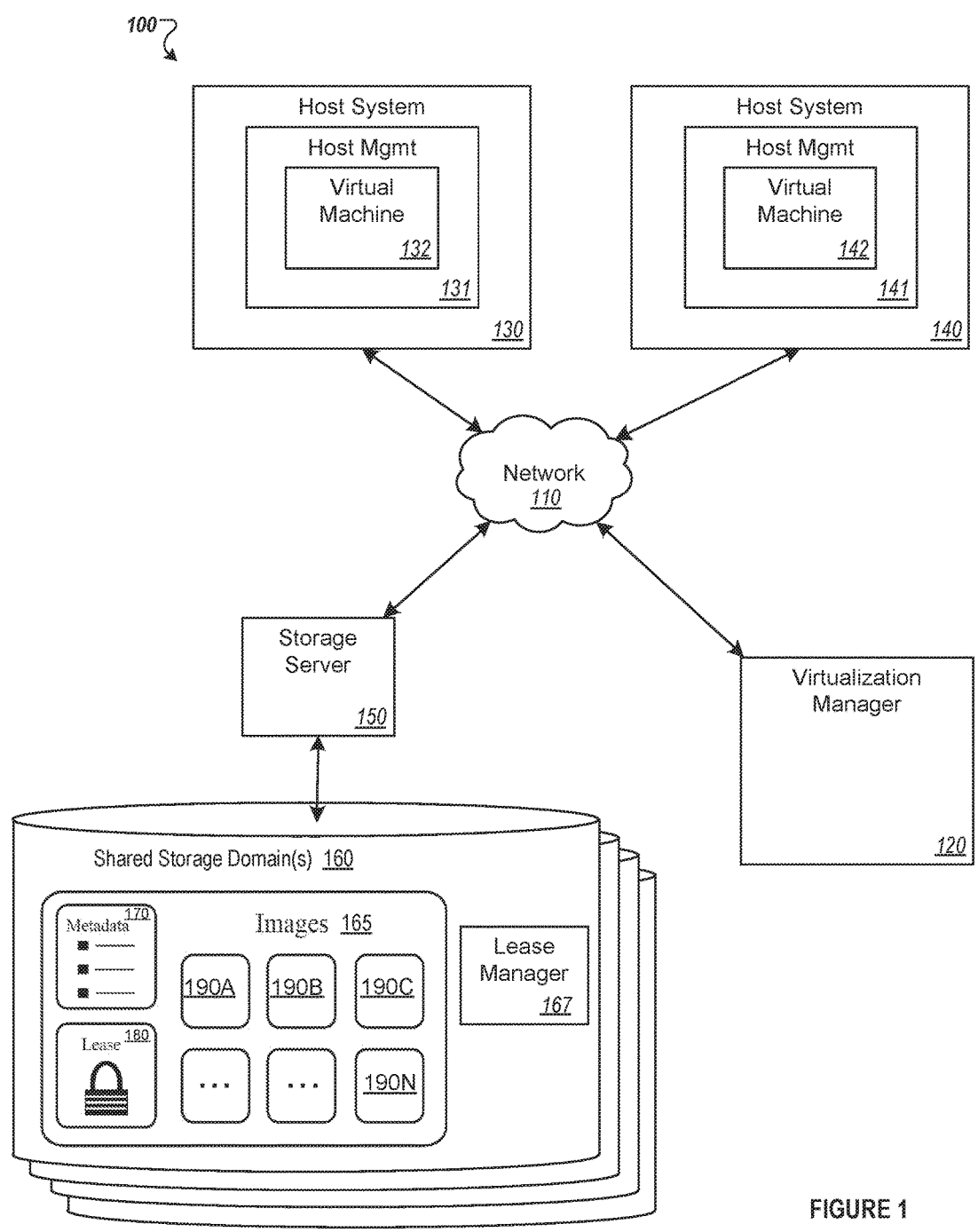
FIG. 1 illustrates an example system architecture in which implementations of the disclosure may operate.

The disclosure provides techniques for determining status of a host operation without accessing the host in a shared storage environment. The shared storage environment may be comprised of a plurality of host computer systems managed by a virtualization manager. Each host computer system (also referred to herein as a "host") may be communicatively coupled, via a network, to one or more storage domains that store disk images of virtual machines. "Storage domain" herein refers to an atomic storage unit, such as a mount point or a folder for a file based storage, or a group of logical unit numbers (LUNs) for a block-based storage.

The host may be associated with a virtual machine (VM). The VM may reference a virtual disk (also referred to as a disk image) that comprises one or more volumes. From the perspective of the VM, these volumes appear as a single disk image. Each volume may comprise areas for storing the disk image data, metadata that stores information associated with volumes used in the virtual disk, such as whether the volume is legal or illegal and whether the volume is shared or has any child volumes, and lease data that may be utilized for managing access to the volume. For example, by obtaining a lease (also known as a lock) with respect to the storage domain of a volume, the host may receive an exclusive access to the volume that would prevent other hosts from accessing the volume while the lease is active.

In some implementations, the host may perform certain operations (e.g., move, copy, update, delete, etc.) on data of the virtual disk. For example, the host may execute an update operation which comprises instructions to copy data of the virtual disk from one volume to another volume. For example, the data may be copied to consolidate space on the system or for processing efficiency. When copying the data from one volume to another, however, the update operation can be interrupted at any time due to unforeseen circumstances, such as an electrical or network outage. Some systems may use certain techniques, such as a checksum, to verify that the update operation was successful. In such cases, counts of the number of bits in a transmission are included with the transmission so that the receiver can check to see whether the same number of bit arrived. Such techniques to include the bit count with each transmission can consume a lot of time and resource when used to calculate large objects, such as the volumes described herein. Other techniques may attempt to access the host to determine if the update operation failed, however, the host may be unavailable or down due to the unforeseen circumstances.

In accordance with the disclosure, techniques are provided to detect whether an operation executed by a host is still underway, failed or succeeded, without having to access the host for state information regarding the operation. In one implementation, before the host initiates an operation, such as a copy operation from a source volume to a destination volume, the host acquires an exclusive lease associated with the source volume and the destination volume. If the lease is acquired, the host modifies an indicator (e.g., bit flag) in a metadata area associated with the destination volume to indicate that the volume's contents are invalid. Then, the host copies data from the source volume to the destination volume. When the copying is finished, the host updates the metadata associated with the destinations volume by clearing the indicator to indicate that the volume's contents are valid. Thereupon, the host releases the lease associated with the volumes.

To determine the status of the host operation, a second host may attempt to acquire the lease associated with the destination volume. If the second host cannot acquire the lease, the second host may determine that the other host is still executing the operation. If the lease can be acquired, then the second host examines the metadata associated with the destination volume to determine whether the volume's contents are valid. If the metadata indicates the contents are valid, then the second host may determine that the host operation of the other host successfully completed. Otherwise, the second host may determine that the operation of the other host has failed in view of the metadata. Thus, there is no need to retrieve any state information from the host because the state of the host operation is self-apparent from the state of the metadata contained exclusively on the destination volume.

In other implementations, the host may use the metadata associated with the destination volume to provide other information regarding the status of the host operation. In one implementation, the host may update a value (e.g., offset) stored in the metadata to indicate an extent of completeness of the update operation. For example, the host may frequently update the value after a certain percentage (e.g., 5%, 10% 15%, etc.) of the data has been copied to the destination volume. Alternatively, the metadata may be used to indicate other information regarding the status of an update operation being executed by the host.

FIG. 1 illustrates an example system architecture 100 in which implementations of the disclosure may operate. The system architecture 100 may include a network 110, a virtualization manager 120, a plurality of host computer systems 130 and 140, and one or more storage servers 150 coupled via the network 110. The network 110 may be a public network (e.g., the Internet), a private network (e.g., a local area network (LAN) or wide area network (WAN)), or a combination thereof. Network 110 may include a wireless infrastructure, which may be provided by one or multiple wireless communications systems, such as a wireless fidelity (WiFi) hotspot connected with the network 110 and/or a wireless carrier system that can be implemented using various data processing equipment, communication towers, etc.

Virtualization manager 120 may include one or more software modules being executed by a host computer system (not shown) for centralized management of the system architecture 100. In one implementation, the virtualization manager 110 may comprise various interfaces, including administrative interface, reporting interface, and/or application programming interface (API) to communicate with the host system 130,140 of the system architecture 100, as well as to user portals, databases, directory servers and various other components which are omitted from FIG. 1 for clarity.

Each of the host systems 130,140 may comprise one or more processors communicatively coupled to memory devices and input/output (I/O) devices, as described in more details herein below with references to FIG. 5. Each of host computer systems 130,140 may run a plurality of virtual machines 132,142, by executing a hypervisor (not shown) to abstract the physical layer, including processors, memory, and I/O devices, and present this abstraction to the virtual machines as virtual devices. The virtual machines 132,142, may execute a guest operating system that may utilize the underlying virtual devices, including virtual processors, virtual memory, and virtual I/O devices. One or more applications may be running on virtual machine under the guest operating system. Each host system 130,140 may run a host management module 131, 141 that manages and monitors various aspects of the host operation, including the storage, memory and network interfaces. In an illustrative example, host management modules 131,141 may be provided by a Virtual Desktop and Server Management (VDSM) daemon.

In certain implementations, host systems 130,140 may be grouped into one or more logical groups that may be also referred to as a "data center" or "cluster". A data center may represent the highest level of abstraction in a virtualization model. Each data center may be communicatively coupled, via the network 110, to one or more storage domains 160 storing disk images 165 of virtual machines, such as virtual machines 132, 142.

The storage domains 160 are employed for storing one or more virtual machine disk images 165, metadata 170 and lease area 180. In an illustrative example, example storage domain 160 may employ file-based storage, in which case disk images 165, domain metadata 170, and a domain lease 180, provided by respective files. In another illustrative example, example storage domain 160 may employ block-based storage, in which case disk images 165, metadata 170, and a lease area 180, provided by respective logical volumes.

Each disk image 165 (also referred to as a virtual disk) may comprise one or more volumes 190A-190N, as schematically illustrated by FIG. 1, for storing disk image data. In an illustrative example, a disk image may represent a volume chain comprising one or more copy-on-write (COW) volumes (which may also be referred to as "layers"). From the perspective of a virtual machine, these volumes appear as a single disk image, as the hypervisor presents the virtual disk to a virtual machine and implements the associated disk read-write operations. Initially, a virtual machine disk image may only comprise one raw or COW volume, which may be made read-only before the first boot of the virtual machine. An attempt to write to a disk by a virtual machine may trigger adding a new COW volume ("layer") to the volume chain. The newly created volume may be made writable, and may only store disk blocks or files which have been modified or newly created by the virtual machine after the previous volume ("layer") has been made read-only. One or more volumes may be added to the volume chain during the lifetime of the virtual machine. In some implementations, making the previous volume read-only (e.g., responsive to receiving a command via an administrative interface), triggers adding of a new COW volume. The virtual disk device implemented by the hypervisor locates the data by accessing, transparently to the virtual machine, each volume of the chain of volumes, starting from the most recently added volume.

Metadata 170 of the storage domains 160 may be employed for storing references to associated volumes (e.g., to parent or child volumes in a copy-on-write chain) and/or other information that may be utilized for volume identification, management, creation, modification, removal, and/or for performing file operations with respect to the data stored on the volumes 190A-190N in the storage domain 160.

The lease area 180 of the storage domains 160 may be employed for storing the information that may be utilized for managing access to the volumes 190A-190N in the storage domain 160. In certain implementations, each of the shared storage domains 160 may provide a centralized locking facility (e.g., lease manager 167) to prevent conflicting access by the host systems 130,140. By obtaining a lease from the lease manager 167 with respect to the storage domain 160, a host system 130, 140 may receive an exclusive access to the storage domain that would prevent other hosts from accessing the storage domain while the lease is active. A lease may have a certain expiration period and may be extended by the requestor. Failure to timely extend a lease 180 may lead to the expiration of the lease 180. The state of the current lease with respect to a given storage domain may be stored in the lease area 180 of the storage domain.

In some implementations, a host system, such as host system 130 and 140, may perform certain operations (e.g., move, copy, update, delete, etc.) on data of disk images 165. In one implementation, this type of operation may include copying data of the disk images 165 from one volume to another volume. In accordance with the disclosure, techniques are provided to determine a status of this operation without accessing the host system directly for such information. For example, the techniques may be used to determine whether the host operation is either still active, or has failed or successfully completed as discussed in more detail below with respect to FIGS. 2 through 5.

Figure 2:
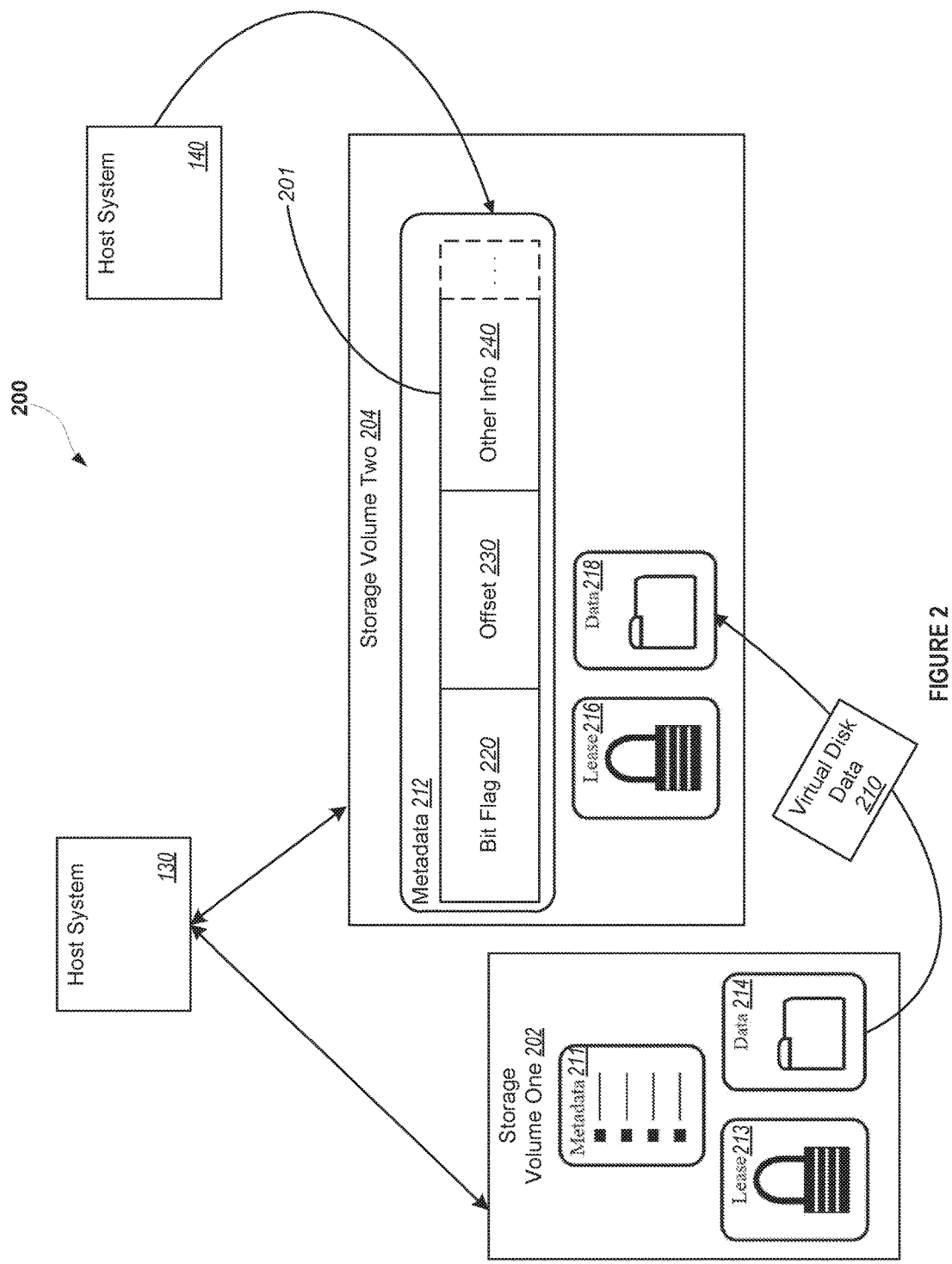
FIG. 2 illustrates an example of a system including a data structure in accordance with one implementation of the disclosure.

FIG. 2 illustrates an example of a system 200 including a data structure 201 in accordance with one implementation of the disclosure. As shown, the system 200 includes host systems 130 and 140 of FIG. 1. In some implementations, the host systems 130 and 140 may be communicatively coupled, via a network (e.g., network 110), to one or more storage domains (e.g. shared storage domains 160) that comprise a plurality of volumes, such as storage volume one 202 and volume two 204. Each storage volume may be stored in the same storage domain or on different storage domains that may be geographically dispersed. The storage volumes 202 and 204 store data (e.g., virtual disk data 210) for disk images of virtual machines.

As shown in FIG. 2, the storage volumes 202, 204 may respectively include volume metadata areas 211, 212, volume lease areas 213, 216 and volume data areas 214, 218. In some implementations, the storage volumes 202, 204 may be implemented using file-based storage, in which case volume data areas 214, 218, volume metadata areas 211, 212, and volume lease areas 213, 216 may be provided by respective files. In other implementations, the storage volumes 202, 204 may be implemented using block-based storage, in which case volume data areas 214, 218 may be provided by a logical volume, while the volume metadata areas 211, 212, and volume lease areas 213, 216 may be provided by segments of respective logical volumes storing metadata and lease information for a plurality of the storage domain volumes. The logical volume segments may be identified by an offset with respect to the logical volume starting block or by an index within an array of pointers identifying the logical volume segments corresponding to the storage domain volumes.

Each storage volume 202,204 may comprise a volume data area (e.g., volume data area 214, 218) for storing the disk image data. The volume metadata areas (e.g., volume metadata area 211, 212) may be employed for storing references to associated volumes (e.g., to parent or child volumes in a copy-on-write chain) and/or other information that may be utilized for volume identification, management, creation, modification, removal, and/or for performing file operations with respect to the files stored on the volume.

In some implementations, the volume metadata areas 211,212 may store a data structure, such as data structure 201. In one implementation, the data structure 201 is used to indicate the status of a host operation executed by the host systems, such as host systems 130 and 140, against the storage volumes 202, 204. For example, the host operation may include copying data from the data area 212 of storage volume one 202 to the data area 218 of storage volume two 204. The data structure 201 may represent a single data structure or multiple data structures residing in the volume metadata areas 211,212. In some implementations, the data structure 201 may comprise various kinds of structures, such as an array, tree, list or other types of data structures, comprising entries to store information related to the host operation.

Information store in the data structure 201 of the metadata 212 may include, for example, a bit flag 220 to indicate if the host operation is complete, an offset 230 to indicate an extent of completeness of the host operation, as well as other information 240. The bit flag 220 may be set to a value that is stored in the data structure 201. For example, the host system executing the host operations may set the bit flag 220 to a value of either 1 or 0. If the bit flag 220 is set to 1, this may represent that data associated with the host operation is invalid indicating that the host operation is incomplete. If the bit flag 220 is set to 0, this may represent that data associated with the host operation is valid indicating that the host operation is complete. The offset 230 may also have a value that is stored in the data structure 201. For example, the offset 230 may be set to a percentage completion value that is applicable to the host operation.

In operation, a host system, such as host system 130, acquires a lease with respect to the volumes. This is done before the host system executes an operation, for example, to copy virtual disk data 210 from volume one 202 to volume two 204. In one implementation, the host system 130 implements a locking protocol (also referred to as SanLock) that uses the lease area (e.g., lease area 213, 216) associated with each volume to implement a distributed locking technique. This locking protocol is used to request a lease that grants the host system 130 an exclusive access to the storage volumes 202, 204 to prevent other hosts from accessing the volume while the lease is active. In some implementations, the lease information may be stored in the respective leases areas 213, 216 of the storage volumes 202, 204. The host system 130 must continually renew a lease after a determined time period, or the lease on the volume will be surrendered.

After the lease is obtained with respect to the storage volumes 202, 204, the host system 130 modifies the data structure 201 associated the destination volume (e.g., storage volume two 204). For example, the host system 130 may set an indicator, such as the bit flag 220 of the data structure 201, to value (e.g., 1). By setting the bit flag, the host system 130 indicates that the virtual disk data 210 with regards to volume two 204 is invalid and is not ready to be accessed from that volume. Then, the host system 130 initiates a host operation with respect to the virtual disk data 210. For example, the host system 130 may execute an instruction to copy the virtual disk data 210 from the data area 214 of volume one 202 to the data area 218 of storage volume two 204.

In one implementation, the host system 130 updates the offset 230 of the data structure 201 during execution of the host operation. For example, the host system 130 may update the offset 230 to a value corresponding to completion amount of the operation being executed. In some implementations, the update of the offset 230 may be triggered when a certain threshold percentage of the operation has completed, such as at five percent (5%) increments.

Upon completion of the host operation, the host system 130 updates the data structure 201 in the volume metadata area 212 of the destination volume. For example, the host system 130 may clear the bit flag 220. This is done by the host system 103 to indicate the virtual disk data 210 with regards to storage volume two 204 is valid and is now ready to be accessed from that volume. Thereupon, the lease associated the storage volumes 202 and 204 are released. For example, the host system 130 utilize the locking protocol to release the lease with respect to each storage volume 202, 204. In some implementations, the lease information that was stored in the respective leases areas 213, 216 of the storage volumes 202, 204 is removed so that other hosts can now access these storage volumes 202, 204.

In accordance with the disclosure, a second host, such as host system 140, is able to determine the state of the host operation associated with virtual disk data 210 on storage volume two 204 without having to retrieve any state information from host system 130. In some situations, the host operation may not have completed successfully because it was terminated before completion due to some type system of network issue.

In operation, the second host like host system 140 attempts to acquire a lease on the storage domain associated with a volume, such as storage volume two 204. For example, the host system 130 may utilize the locking protocol to request a lease on storage volume two 204. In some situations, the locking protocol may deny the lease request of the second host system 140 because a lease on storage volume two 204 is unavailable. If the lease is unavailable, the second host system 140 may determine that the host operation is incomplete because another host system 130 is still holding onto a lease for storage volume two 204. In this regard, if the lease is not renewed by the holder after a certain period of time, the lease will eventually expire. At that time, the second host system 140 is able to make a request to acquire a lease with respect to storage volume two 204

In response to acquiring the lease, the second host system 140 then identifies a data structure 201 on storage volume two 204. For example, the data structure 201 may be identified in the metadata 212 of the volume 204. In view of modifications to the data structure, the host system 140 can determine whether an operation related to the virtual disk data 210 on storage volume two 204 has succeeded for failed. For example, the host system 140 may examine an indicator, such as bit flag 220, stored in the data structure 201. This bit flag 220 indicates whether the virtual disk data 210 on storage volume two 204 is valid or invalid. If the virtual disk data 210 is invalid, this indicates that a host operation related to the virtual disk data 210 on storage volume two 204 failed. Otherwise, the host operation completed successfully. In some implementations, the second host system 140 may also examine the offset 230 stored in the data structure 201 that indicates the extent of completeness of the host operation by the other host, such as a percentage of completion.

Figure 3:
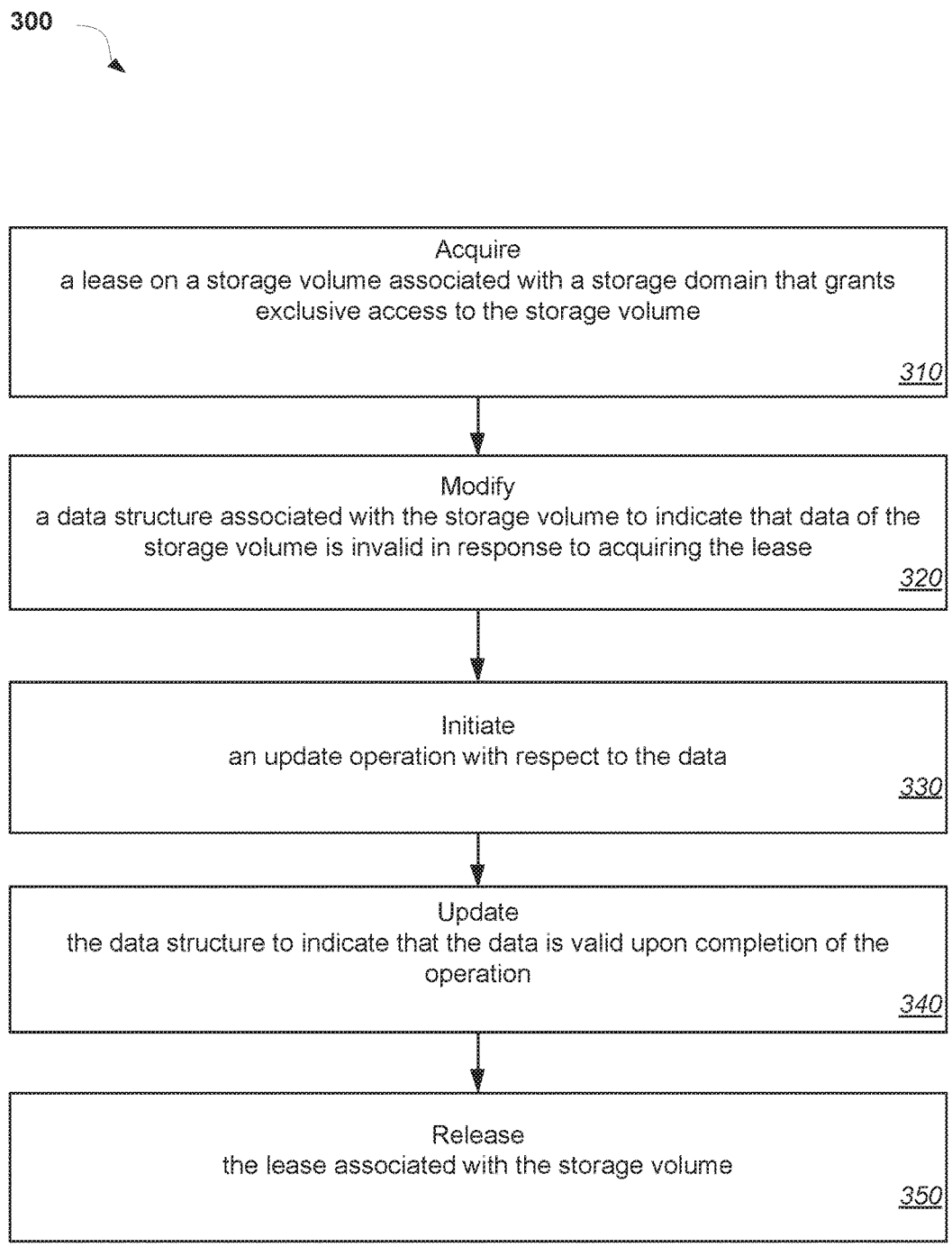
FIG. 3 is a flow diagram of an example method to execute a virtual machine to perform a host operation in a shared storage environment in accordance with one implementation of the disclosure.

FIG. 3 is a flow diagram of an example method 300 to execute a virtual machine to perform a host operation in a shared storage environment in accordance with one implementation of the disclosure. In one implementation, a host system (e.g., host system 130 or host system 140 of FIG. 1) may perform method 300. The method 300 may be performed by processing logic that may comprise hardware (circuitry, dedicated logic, etc.), software (e.g., software executed by a general purpose computer system or a dedicated machine), or a combination of both. In alternative implementations, some or all of the method 300 may be performed by other components of the shard storage system. In other implementations, the blocks depicted in FIG. 3 can be performed simultaneously or in a different order than that depicted.

As shown, method 300 begins at block 310 where a lease on a storage domain associate with the storage volume is acquired by a processing device. The lease grants the processing device exclusive access to the storage volume. In block 320, responsive to acquiring the lease, a data structure associated with the storage volume is modified to indicate that data (e.g., virtual disk data) is invalid. For example, the host system may set a bit flag of a data structure to indicate that the data is invalid. Thereupon, an update operation associated with the data is initiated in block 330. For example, a host system may execute a copy operation to copy data from one volume to another volume. Upon completion of the operation, the data structure is updated to indicate that the data is valid in block 340. For example, the host system may clear the bit flag to indicate that the virtual disk is now valid. In block 350, the lease on the storage domain associated with the storage volume is released.

Figure 4:
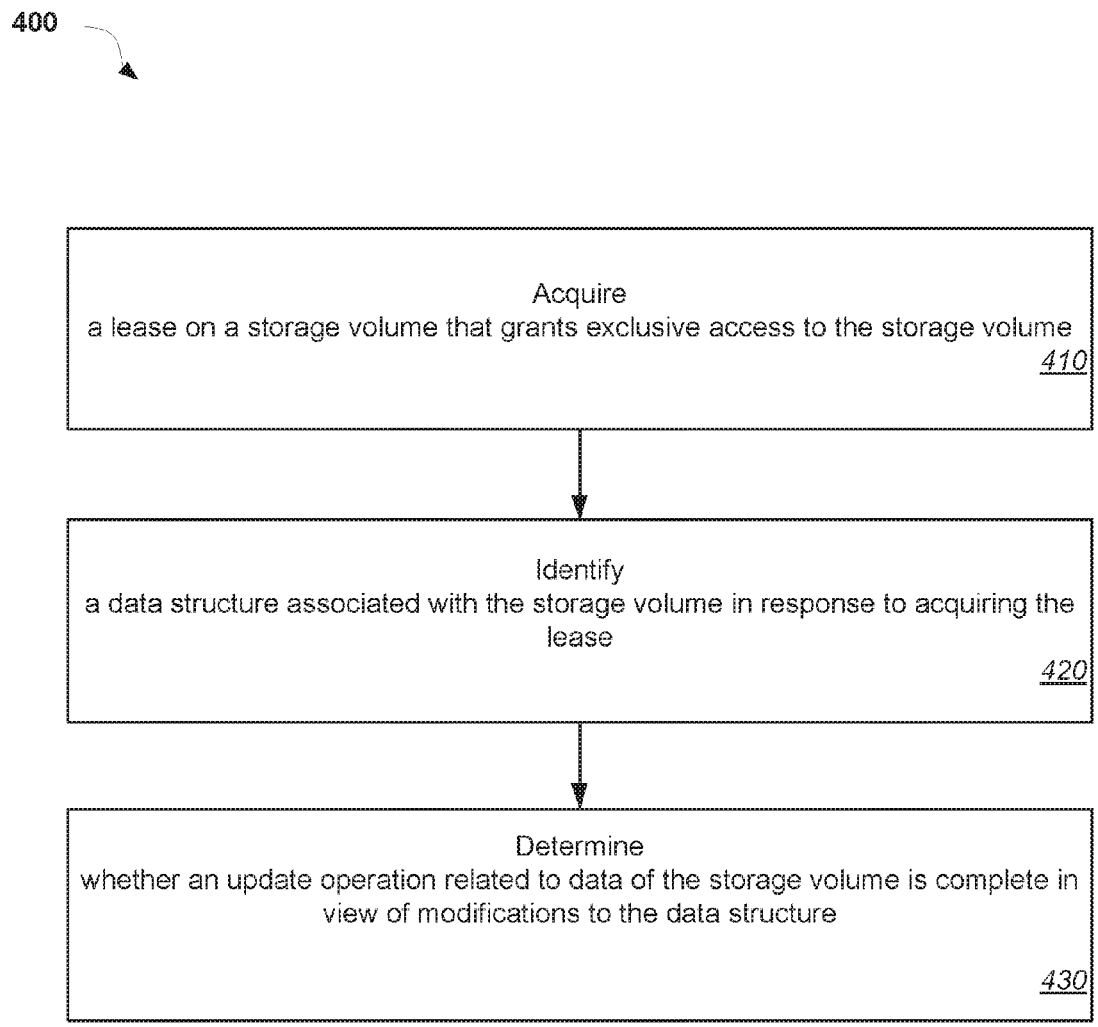
FIG. 4 is a flow diagram of an example method to determine status of a host operation without accessing the host in a shared storage environment in accordance with one implementation of the disclosure.

FIG. 4 is a flow diagram of an example method 400 to determine the status of a host operation without accessing the host in a shared storage environment in accordance with one implementation of the disclosure. In one implementation, a host system (e.g., host system 130 or host system 140 of FIG. 1) may perform method 400. The method 400 may be performed by processing logic that may comprise hardware (circuitry, dedicated logic, etc.), software (e.g., software executed by a general purpose computer system or a dedicated machine), or a combination of both. In alternative implementations, some or all of the method 400 may be performed by other components of a shared storage system. In other implementations, the blocks depicted in FIG. 4 can be performed simultaneously or in a different order than that depicted.

As shown, method 400 begins at block 410 where a lease associated with a storage volume is acquired. The lease grants the processing device exclusive access to the storage volume. In block 420, a data structure associated with the storage volume is identified in response to acquiring the lease. A determination is made that an update operation on data (e.g., virtual disk data) of the storage volume is complete in view of modifications to the data structure in block 430. For example, the host system may examine a bit flag stored in the data structure to determine whether the data is valid and can be accessed or invalid indicating that the host operation failed before completion.

Figure 5:
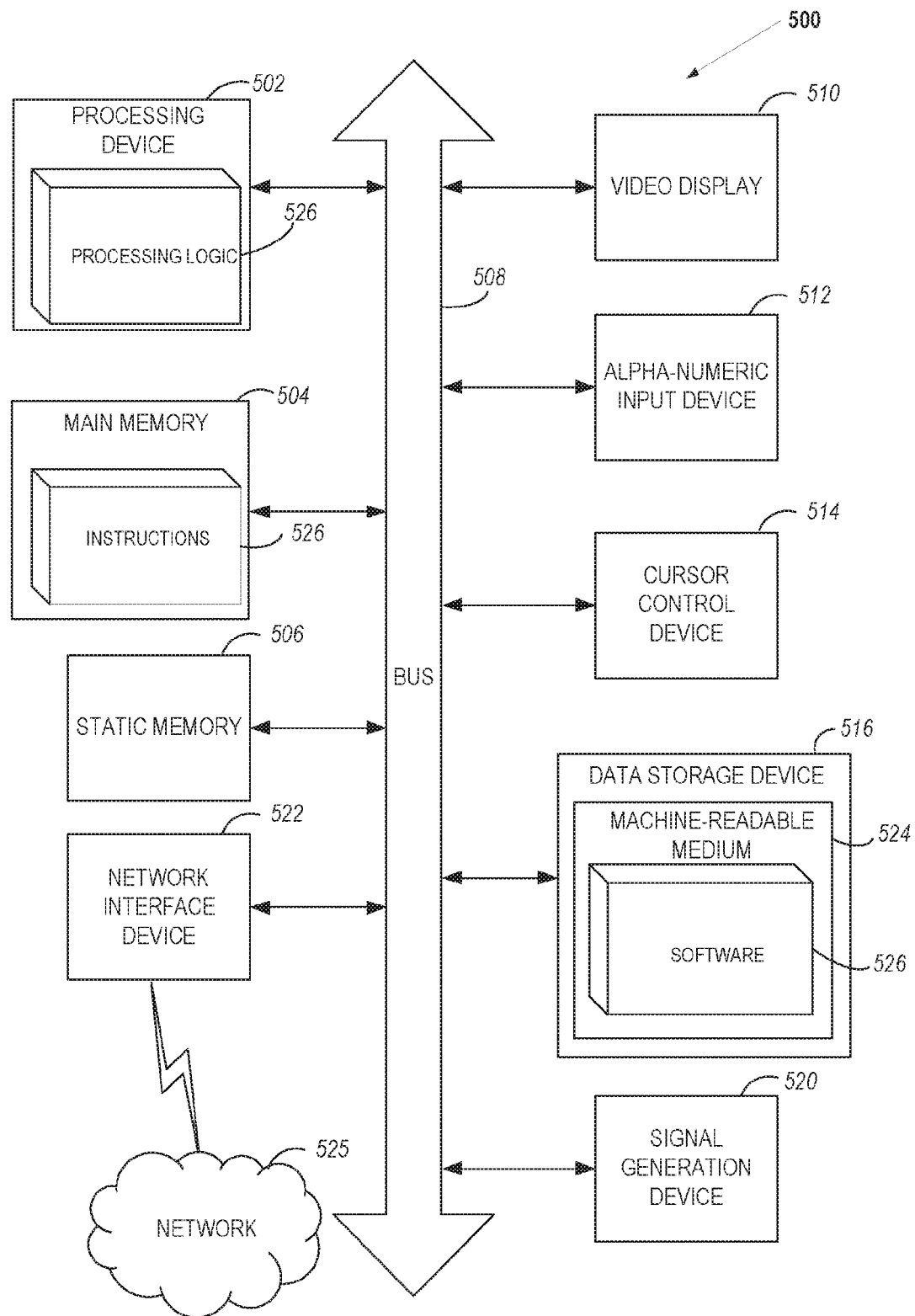
FIG. 5 illustrates a block diagram of an implementation of a computer system in which some implementations of the disclosure may operate.

FIG. 5 illustrates a diagrammatic representation of a machine in the example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is to execute the processing logic 526 for performing the operations and steps discussed herein.

The computer system 500 may further include a network interface device 522 communicably coupled to a network 564. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a non-transitory machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The non-transitory machine-readable storage medium 524 may also be used to store instructions 526 for determining status of a host operation without accessing the host in a shared storage environment as described herein, and/or a software library containing methods that call the above applications. While the machine-accessible storage medium 524 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "instructing" or "determining" or "acquiring" or "identifying" or "generating" or "examining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
acquiring, by a processing device, a lease on a storage volume associated with a storage domain, the lease granting the processing device exclusive access to the storage volume; responsive to acquiring the lease:
modifying, by the processing device, a data structure associated with the storage volume to indicate that data of the storage volume is invalid;
initiating an update operation with respect to the data;
updating, by the processing device upon completion of the update operation, the data structure to indicate that the data is valid; and releasing, by the processing device, the lease on the storage domain associated the storage volume.

2. The method of claim 1, wherein the update operation comprises instructions to copy data to the storage volume from another storage volume.

3. The method of claim 1, wherein the modifying comprises one of: setting or clearing an indicator stored in the data structure.

4. The method of claim 1, wherein the data of the storage volume is related to a virtual disk of a virtual machine executed by the processing device.

5. The method of claim 1, further comprising updating a value stored in the data structure, the value indicative of an extent of completeness of the update operation.

6. A system comprising:
a memory storing a plurality of storage volumes; and
a processing device, operatively coupled to the memory, to
  acquire a lease on a storage volume associated with a storage domain, the lease granting the processing device exclusive access to the storage volume;
responsive to acquiring the lease:
  modify a data structure associated with the storage volume to indicate that data of the storage volume is invalid;
  initiate an update operation with respect to the data;
  update, upon completion of the update operation, the data structure to indicate that the data is valid; and
  release the lease on the storage domain associated the storage volume.

7. The system of claim 6, wherein the update operation comprises instructions to copy data to the storage volume from another storage volume.

8. The system of claim 6, wherein to modify, the processing device is further to at least one of: set or clear an indicator stored in the data structure.

9. The system of claim 6, wherein the data of the storage volume is related to a virtual disk of a virtual machine executed by the processing device.

10. The system of claim 6, wherein the processing device is further to update a value stored in the data structure, the value indicative of an extent of completeness of the update operation.

11. A non-transitory computer-readable storage medium comprising executable instructions that when executed, by a processing device, cause the processing device to:
  acquire, by the processing device, a lease on a storage volume associated with a storage domain, the lease granting the processing device exclusive access to the storage volume; responsive to acquiring the lease:
  modify a data structure associated with the storage volume to indicate that data of the storage volume is invalid;
  initiate an update operation with respect to the data;
  update, upon completion of the update operation, the data structure to indicate that the data is valid; and
  release the lease on the storage domain associated the storage volume.

12. The non-transitory computer-readable storage medium of claim 11, wherein the update operation comprises instructions to copy data to the storage volume from another storage volume.

13. The non-transitory computer-readable storage medium of claim 11, wherein to modify, the processing device is further to at least one of: set or clear an indicator stored in the data structure.

14. The non-transitory computer-readable storage medium of claim 11, wherein the data of the storage volume is related to a virtual disk of a virtual machine executed by the processing device.

15. The non-transitory computer-readable storage medium of claim 11, wherein the processing device is further to update a value stored in the data structure, the value indicative of an extent of completeness of the update operation.

16. A method comprising:
acquiring, by a processing device of a shared storage system, a lease on a storage volume, the lease granting the processing device exclusive access to the storage volume;
responsive to acquiring the lease:
  identifying, by the processing device, a data structure associated with the storage volume on a storage domain;
  modifying, by the processing device, the data structure to indicate that data of the storage volume is invalid;
  determining, by the processing device, whether an update operation related to the data of the storage volume is complete in view of modifications to the data structure; and
  updating the data structure to indicate that the data is valid in view of the determining.

17. The method of claim 16, wherein further comprising responsive to detecting that the lease is unavailable, determining that the update operation is incomplete.

18. The method of claim 16, wherein the determining comprises examining an indicator stored in the data structure, the indicator indicates whether data associated with the update operation is invalid.

19. The method of claim 18, wherein the examining comprises determining whether the indicator is set or cleared.

20. The method of claim 16, further comprising examining a value stored in the data structure, the value indicative of an extent of completeness of the update operation.

* * * * *